(12) United States Patent
Gillard et al.

(10) Patent No.: US 8,550,134 B2
(45) Date of Patent: Oct. 8, 2013

(54) LOW ASPECT RATIO SUPER SINGLE TRUCK TIRE WITH A SPLIT BREAKER

(75) Inventors: Jean-Michel Alphonse Fernand Gillard, Arlon (BE); Roland Willibrord Krier, Wasserbillig (LU); Francois Pierre Georges, Stavelot (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 259 days.

(21) Appl. No.: 13/038,551

(22) Filed: Mar. 2, 2011

(65) Prior Publication Data
US 2012/0222791 A1    Sep. 6, 2012

(51) Int. Cl.
| | |
|---|---|
| *B60C 9/18* | (2006.01) |
| *B60C 9/20* | (2006.01) |
| *B60C 9/22* | (2006.01) |
| *B60C 9/26* | (2006.01) |

(52) U.S. Cl.
USPC ............ 152/526; 152/528; 152/531; 152/535

(58) Field of Classification Search
USPC ................................................. 152/526–538
See application file for complete search history.

(56) References Cited

U.S. PATENT DOCUMENTS

| | | | | |
|---|---|---|---|---|
| 3,677,319 | A | * | 7/1972 | Mirtain .......................... 152/527 |
| 4,669,520 | A | * | 6/1987 | Koseki et al. .................. 152/527 |
| 4,696,335 | A | * | 9/1987 | Tsukagoshi et al. ........... 152/535 |
| 6,401,778 | B1 | | 6/2002 | Cluzel |
| 7,559,349 | B2 | * | 7/2009 | Tsuruta et al. ................. 152/527 |
| 2005/0126674 | A1 | | 6/2005 | Hardy et al. |
| 2009/0211685 | A1 | * | 8/2009 | Kabe et al. ..................... 152/531 |

FOREIGN PATENT DOCUMENTS

| | | | |
|---|---|---|---|
| GB | 2017019 | A * | 10/1979 |
| JP | 53119502 | * | 10/1978 |

OTHER PUBLICATIONS

Japio Summary: JP53-119502; Mihashi, Kenhachi; (no date).*

* cited by examiner

*Primary Examiner* — Richard Crispino
*Assistant Examiner* — Kendra Shin
(74) *Attorney, Agent, or Firm* — David L. King

(57) ABSTRACT

The present invention is directed to a pneumatic tire 1, in particular a low aspect ratio super single truck tire 1. In accordance with the invention, the tire has a crown reinforcing structure with a first breaker 9 between a carcass ply 3 and a tread 5, as well as four further breakers 11, 13, 15, 17 comprising at least one pair of working breakers between the first breaker 9 and the tread 5, wherein the first breaker 9 is a split breaker comprising two circumferential strips 9 essentially adjacent to the shoulders of the tire, each strip having an axial width comprised between 50% and 70% of the half tread width.

17 Claims, 3 Drawing Sheets

LOW ASPECT RATIO SUPER SINGLE TRUCK TIRE WITH A SPLIT BREAKER

FIELD OF THE INVENTION

The present patent application is directed to a tire, in particular a pneumatic wide base low aspect ratio tire for trucks.

BACKGROUND OF THE INVENTION

Super single tires, which are wide base low aspect ratio truck tires replacing two small base tires, so-called dual mounted tires, have been used for years on trailers. Such tires are usually of size 385/65R22.5 or 385/55R22.5 and have a maximum load-carrying capacity of 4.5 metric tons.

Over the years these wide base tires appeared more and more on trucks in the steering position because they had an expected higher mileage.

It has become of interest to use also super single tires in the drive positions.

Tires in the drive position have to bear a part of the trailer load and must have an increased load capacity. Tire standards define a load capacity of 5.8 metric tons and a maximum speed of 110 km/h. These tires have very low aspect ratios and are usually of size 495/45R22.5. Drive tires are exposed to harsh service conditions and conventional constructions show crown area durability problems. Furthermore, the pressure distribution through the elastomeric blocks in the footprint lacks the required uniformity.

U.S. Pat. No. 6,401,778 B1 discloses a pneumatic truck tire having a radial carcass reinforcement and two working crown plies of inextensible reinforcing elements. An additional ply essentially parallel to the circumferential direction of the tire is positioned between the two working plies. Both working plies extend axially beyond the axial width of the additional ply and are coupled with each other over an axial length of at least 16% of the maximum axial width of the carcass reinforcement. This tire design may constitute an improvement with regard to earlier truck tires. However, durability and footprint shape leave still room for improvements.

US 2005/0126674 A1 discloses another pneumatic truck tire, in particular a super single radial truck tire. The tire comprises a crown reinforcing structure including a single helically wound belt ply reinforced with high elongation steel cords. In one embodiment of this publication, the tire comprises four belts on top of two steel strips. The strips are located between the carcass ply and the radially inner helically wound ply. In practice, said tire may show groove cracking at the intermediate shoulder groove resulting in an unsatisfactory durability. Furthermore, breaker edge separation between the radially outer breakers may occur under heavy duty resulting as well in an unfavorable durability and/or stability. Moreover, the footprint shape of said tire may still be improved. At last, the described tire may show an increased shoulder wear decreasing the performance of the tire.

SUMMARY OF THE INVENTION

In view of the above mentioned prior art, it is an object of the invention to improve the durability of a wide base low aspect ratio tire, in particular to improve the crown area durability.

It is another object of the invention to improve the footprint shape and/or footprint pressure distribution of wide base low aspect ratio tires.

Still another object of the invention is to avoid groove cracking at the intermediate shoulder groove and/or to reduce shoulder wear.

In an embodiment according to the invention a pneumatic tire comprises at least one pair of parallel annular beads, at least one carcass ply wrapped around said beads, a tread, first and second sidewalls disposed between said tread and one of said at least one pair of beads, and a crown reinforcing structure disposed between said at least one carcass ply and said tread in a crown area of said tire. Still in accordance with the first embodiment said crown reinforcing structure comprises a first breaker between the tread and the at least one carcass ply, a second breaker between the tread and the first breaker, a third breaker between the tread and the second breaker, a fourth breaker between the tread and the third breaker, and a fifth breaker between the tread and the fourth breaker, wherein two of the third, fourth, and fifth breakers constitute a pair of working breakers, and wherein the first breaker is a split breaker comprising two circumferential strips essentially adjacent to the shoulders of the tire, each strip having an axial width comprised between 50% and 70% of the half tread width.

The features according to this embodiment of the invention turned out to be of particular advantage. At first, groove cracking at the intermediate shoulder groove under heavy duty can be avoided. Second, durability of the tire has been improved in general. The strips can have equal axial distances with respect to the equatorial plane of the tire.

In an aspect of the invention, wedges are provided between axial edges (or ends) of the first and the second breakers and/or between the axial edges the fourth and the fifth breakers. This feature may further improve the durability of the tire, e.g. by reducing possible breaker edge separation. Furthermore, the applicants discovered that the application of these wedges results in a substantial improvement in connection with the features of the above mentioned embodiment.

In another aspect of the invention, each strip has an axial width comprised between 55% and 65% of the half tread width. This preferred range results in a significant improvement of the durability of the tire and a good footprint shape during the tire's operation.

In still another aspect of the invention, the axially outer edge of at least one of the strips of the first breaker is spaced an axial distance from the equatorial plane of between 80% and 105%, preferably between 80% and 95%, of the half tread width. This arrangement of the split breaker has also the advantage of an improved stability and an improved durability.

In yet another aspect of the invention, the distance of the axially outer ends of the first breaker from the equatorial plane is larger than the distance of the axially outer ends of the second breaker from the equatorial plane. Moreover, the axial width of the second breaker can be larger than the axial width of the third breaker, the axial width of the third breaker can be larger than the axial width of the fourth breaker, and the axial width of the fourth breaker can be larger than the axial width of the fifth breaker. This design of breakers of decreasing axial widths results in an improved stability of the tire.

In still another aspect of the invention, the fourth breaker has an axial width comprised between 55% and 75% of the tread width. This range provides a better durability of the tire. In particular, this feature improves the durability of the shoulder groove region.

In still another aspect of the invention, the axially outer edges of the strips of the first breaker extend axially beyond the second, third, fourth, and fifth breakers.

In still another aspect of the invention, the tread of the tire comprises circumferentially arranged ribs, wherein the axial width of the shoulder rib is between 10% and 30% larger than the width of a center rib, and/or the width of an intermediate rib is up to 15% larger than the width of a center rib. This feature helps in substantially improving the lateral stiffness of the shoulder and thus also in improving durability.

In still another aspect of the invention, the second and the third breakers have essentially the same axial width, and the fourth breaker has essentially the same axial outer edge position as the strip of the first split breaker.

In yet another aspect of the invention, the axially outer ends of the fourth breaker and the axially inner ends of the strips overlap by between 25% and 35% of the half tread width, and optionally, the axially outer ends of the fifth breaker and the axially inner ends of the strips overlap by between 5% and 15% of the half tread width.

In yet another aspect of the invention the first breaker has a Right orientation, the fourth breaker has a Right orientation, and the fifth breaker has a Left orientation with respect to the equatorial plane of the tire, or vice versa. Vice versa means that the R-R-L orientation is replaced by an L-L-R orientation of the breakers with respect to the equatorial plane of the tire. In this aspect, the fourth and the fifth breakers form the pair of working breakers.

In another aspect of the invention the first breaker has an angle comprised between 40° and 80° with respect to the equatorial plane of the tire, the second breaker has an angle comprised between 0° and 4° with respect to the equatorial plane of the tire, the third breaker has an angle comprised between 0° and 4° with respect to the equatorial plane of the tire, and the fourth and the fifth breakers have essentially opposite angles comprised between 30° and 75° with respect to the equatorial plane of the tire. In particular, this arrangement of breakers has proved to be advantageous in investigations of the applicants. In general, it is possible that the second and the third breakers are made of one (integral) ply which is folded and placed radially above the first breaker.

It is remarked that the above mentioned aspects or features can also be combined with each other and are in the scope of the invention as well.

DEFINITIONS

As used herein and in the claims,

"Aspect ratio" refers to the ratio of the tire's section height to its section width;

"Axial" and "axially" refer to directions which are parallel to the axis of rotation of a tire;

"Radial" and "radially" refer to directions that are perpendicular to the axis of rotation of a tire;

"Bead" refers to that part of a tire comprising an annular tensile member, the bead core, wrapped by ply cords and shaped, with or without other reinforcement elements to fit a designed tire rim;

"Breaker" refers to an annular layer or ply of parallel cords, woven or unwoven, underlying the tread, not anchored to the bead;

"Carcass" refers to the tire structure apart from the belt structure, tread, undertread, and sidewall rubber but including the beads, (carcass plies are wrapped around the beads);

"Circumferential" refers to lines or directions extending along the perimeter of the surface of the annular tread perpendicular to the axial direction;

"Crown" refers to substantially the outer circumference of a tire where the tread is disposed;

"Equatorial plane (EP)" refers to a plane that is perpendicular to the axis of rotation of a tire and passes through the center of the tire's tread;

"Footprint" refers to the contact patch or area of contact of the tire tread with a flat surface at zero speed and under normal load and pressure or under specified load, pressure and speed conditions;

"Ply" refers to a continuous layer of rubber coated parallel cords;

"Super single tire" refers to a tire which replaces dual mounted tires on a specific axle; they are low aspect ratio tires and have a section width exceeding the section width of one of the previously dual mounted tires but inferior to the dual assembly width; and "Tread width (TW)" refers to the arc length of the tread surface in the axial direction, that is, in a plane passing through the axis of rotation of the tire.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
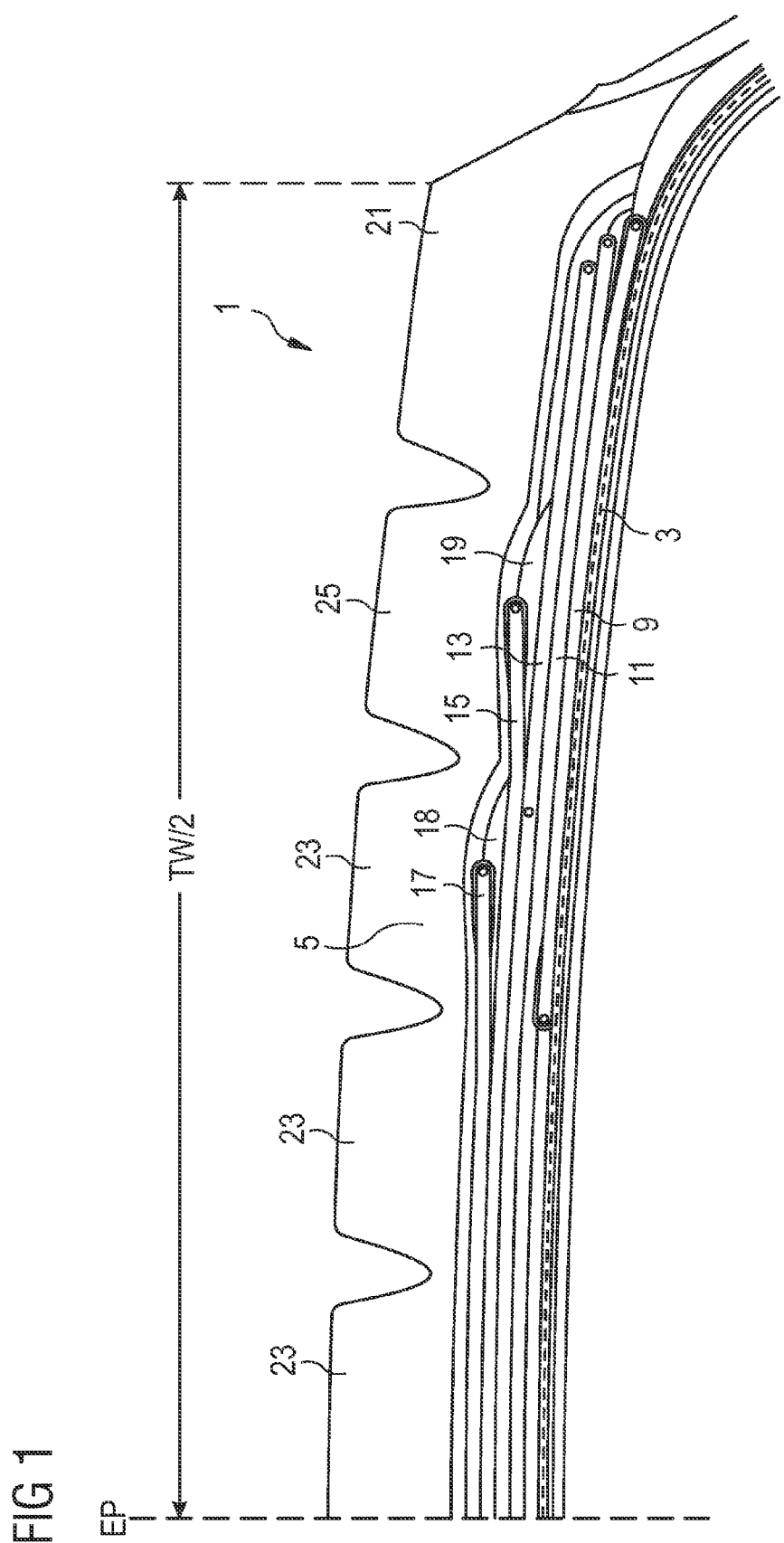
FIG. 1 is a cross-sectional view of a tire's crown according to an embodiment of the invention.

The following language is of the best presently contemplated mode or modes of carrying out the invention. This description is made for the purpose of illustrating the general principles of the invention and should not be understood in a limiting sense. The scope of the invention is best determined by reference to the appended claims. The reference numerals as depicted in the drawings are the same as those referred to in the specification.

FIG. 1 depicts a preferred embodiment of the invention showing one (axial) half of the crown area of a tire 1. In accordance with this embodiment, the tire 1 comprises a tread 5 including tread ribs 23, 25, 21. In particular, the tire 1 comprises one or more center ribs 23, a shoulder rib 21, as well as an intermediate rib 25 axially between the shoulder rib 21 and the center ribs 23 of the tread 5. Alternatively, the tire 1 could also comprise tread blocks instead of at least some of the tread ribs 23, 25, 21

Five breakers 9, 11, 13, 15, 17 are arranged between the tread 5 and a carcass ply 3 of the tire 1. In particular, the first breaker 9 is a split breaker. The split breaker 9 comprises two circumferential strips, essentially in the shoulder area of the tire 1. In accordance with the depicted embodiment, the width of each strip is about 60% of the half tire width TW/2. Although this width is of particular advantage, other widths are possible, as for example between 50% and 70% of the half tread width TW/2. Preferably, the distance of the inner edge of a strip from the equatorial plane EP of the tire 1 is at least 25% of half the tread width TW/2. The first breaker 9 has preferably a Right orientation and an angle comprised between 40° and 80° with respect to the equatorial plane EP of the tire 1. This breaker 9 may be reinforced with steel wire 4+3×0.41 having an EPI of 10 to 12, or preferably of 11. However, other reinforcing elements could be used as well.

A second breaker 11 having an angle of between 4° Left (4L) or 4° Right (4R), preferably of essentially 0° with respect to the equatorial plane EP of the tire 1, is arranged radially above the first (split) breaker 9. The second breaker 11 may comprise a high elongation steel wire 3×7×0.22 with an EPI between 11 and 14. However, other reinforcing elements or wires could be used.

A third breaker 13 is arranged radially above the second breaker 11, the third breaker 13 having an angle of between 4° Left or 4° Right with respect to the equatorial plane of the tire 1. Preferably, the angle is about 0°. The second breaker 11 may comprise a high elongation steel wire 3×7×0.22 with an EPI between 11 and 14. As for the second breaker 11, other reinforcing elements could be used for the third breaker 13.

As already mentioned above, the second and the third breakers 11, 13 may be generally made up of one belt ply being folded and placed radially upon the first breaker 9, or between the first breaker 9 and the fourth breaker 15.

A fourth breaker 15 and a fifth breaker 17 are arranged on top of the third breaker 13. The fourth and the fifth breakers 15, 17 are crossed with essentially opposite angles having essentially equal absolute values. The angles may be comprised between 30° and 75°. Moreover, both breakers 15, 17 may be reinforced with steel wire 4+3×0.41. The EPI of the wire may be between 10 to 12, and preferably about 11. Nevertheless, other reinforcement wires could be used.

Furthermore, FIG. 1 shows (rubber) wedges 18, 19 between the fourth and the fifth breakers 15, 17 and between the third and the fourth breakers 13, 15. These wedges 18, 19 have mainly the purpose of avoiding a separation of the breakers during operation of the tire 1.

The axial width of the fifth breaker 17 is preferably about 50% of the tread width TW (two times TW/2), or comprised between 45% and 50% of the tread width TW.

The axial width of the fourth breaker 15 is preferably about 65%, and even more preferable, comprised between 55% and 75% of the tread width TW.

The axial width of the third and the second breakers 13, 11 is preferably comprised between 88% and 98% of the tread width TW, and preferably between 90% and 95% of the tread width TW.

As well known in the state of the art of truck tires, it is of course possible to provide the crown reinforcement with a radially outer belt ply reinforced with nylon cords, such as nylon monofilament cords. The outer belt ply has as prime objective to protect the steel cords from humidity and to protect the crown reinforcing structure during the different steps of a retreading operation such as tread buffing.

Figure 2:
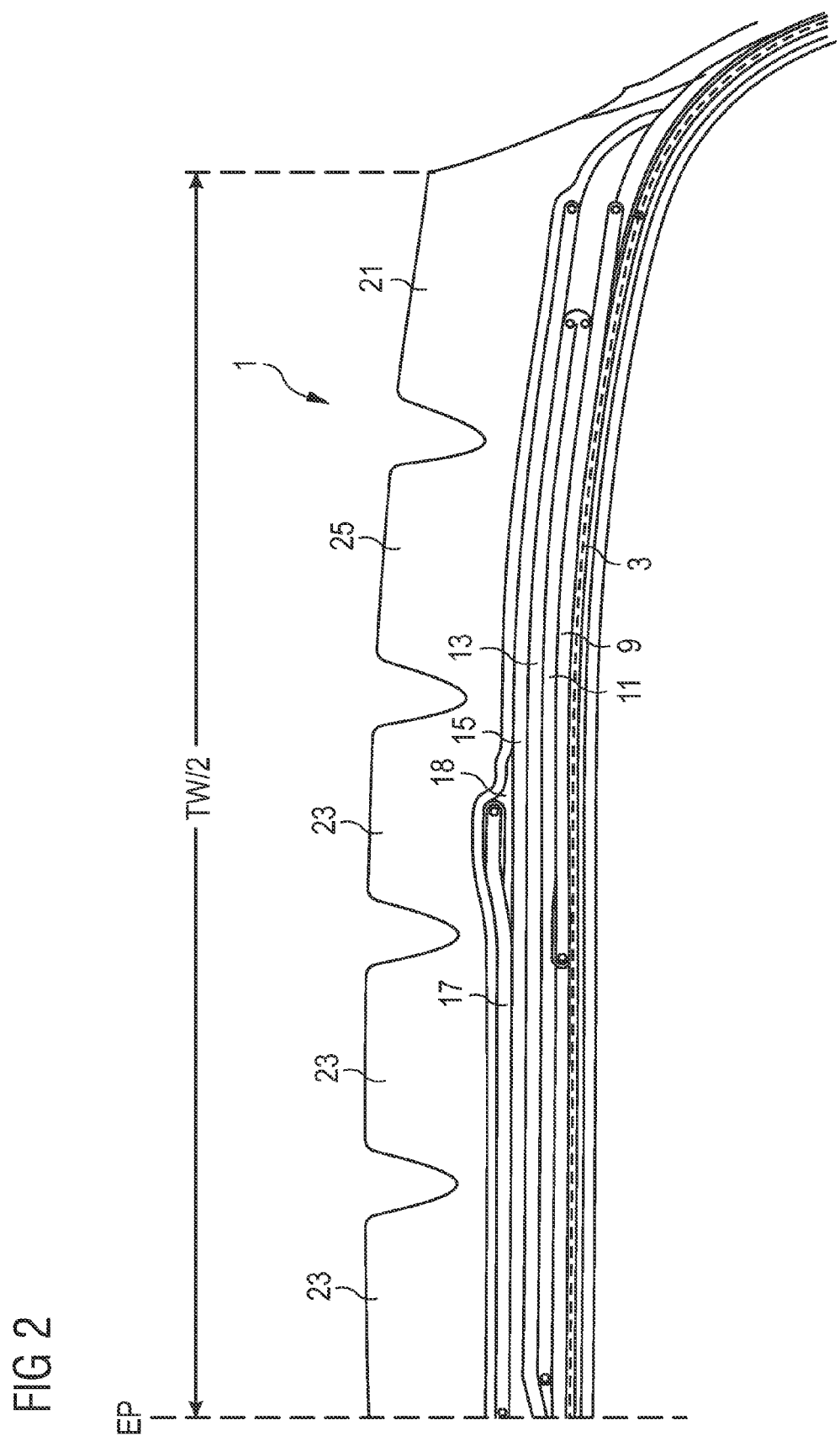
FIG. 2 is a cross-sectional view of a tire's crown according to another embodiment of the invention.

FIG. 2 shows another preferred embodiment in accordance with the invention. Since many aspects of this embodiment are similar to the aspects shown in FIG. 1, the same reference numerals have been used. The depicted embodiment comprises 5 breakers 9, 11, 13, 15, 17 between the tread 5 and the carcass ply 3 of the tire 1. However, the second and the third breakers 11, 13 have an equal axial width, comprised between 85% and 95% of the tread width TW, and more preferably between 88% and 93% of the tread width TW. In the depicted example the second and the third breakers 11, 13 are made up of one single ply folded about a circumferential axis. Furthermore, the axially outer edges of the first and the fourth breakers 9, have essentially the same axial distance from the equatorial plane EP of the tire 1, whereas the distance is preferably comprised between 88% and 98% of the half tread width TW/2. Optionally, the fifth breaker 17 has an axial width comprised between 45% and 55% of the tread width TW. As also shown in FIG. 2, the first split breaker 9 (as already described with regard to FIG. 1) may overlap with the fifth breaker 17 in an axial direction of the tire 1. Preferably, the width of this overlap is comprised between 5% and 15% of the half tread width TW/2, or even more preferably between 10% and 12%. The embodiment in accordance with FIG. 2 results in a good footprint shape and in an enhanced durability.

Figure 3:
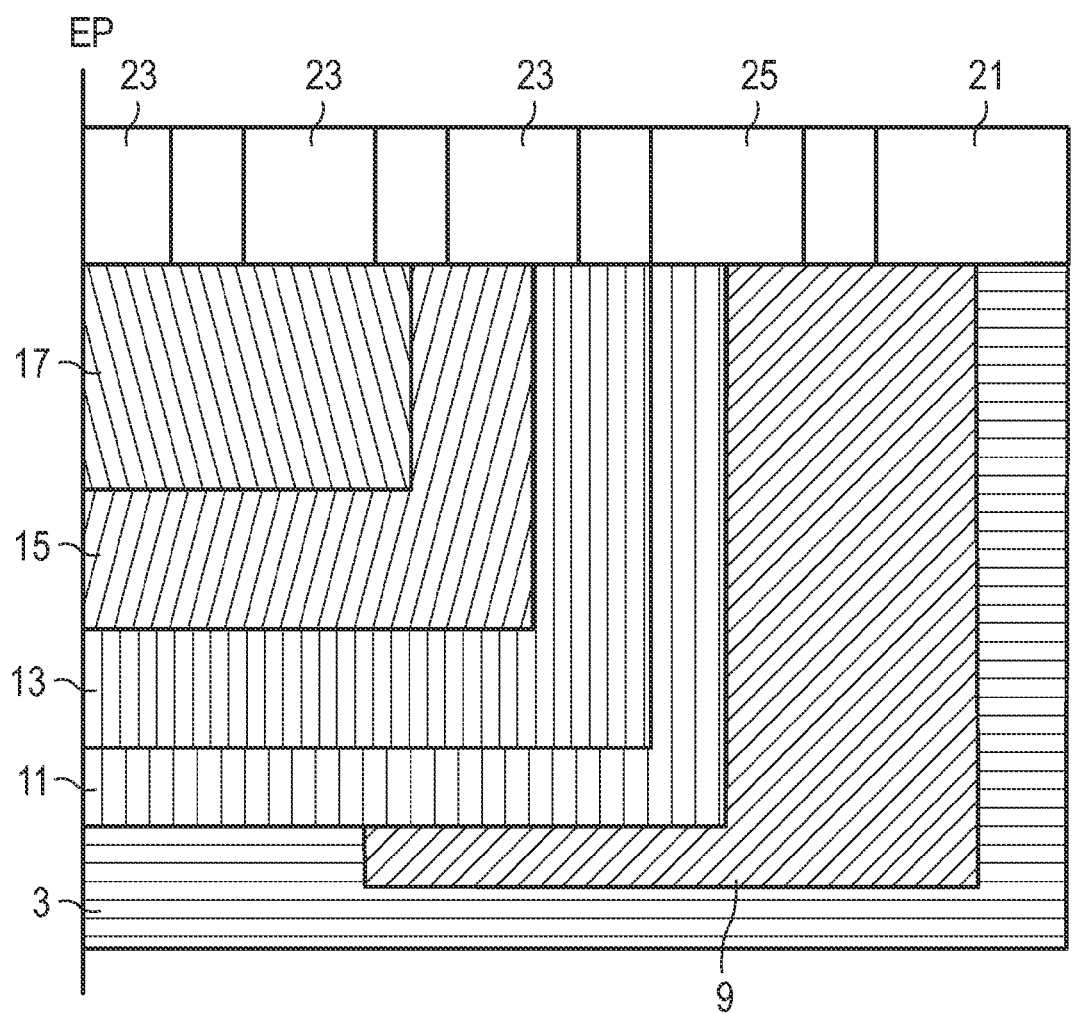
FIG. 3 schematically illustrates a plan view of a portion of the crown reinforcing structure according to the embodiments shown in FIG. 1 or FIG. 2.

FIG. 3 schematically illustrates a plan view of a portion of the crown reinforcing structure according to the embodiments shown in FIG. 1 or FIG. 2. For the sake of a better comprehensibility a part of the tread 5 has been removed showing portions of each breaker 9, 11, 13, 15, 17 as well as of the carcass ply 3. The depicted hatching must not be understood as limiting.

In particular, the described embodiments could be used for a 495/45R22.5 low aspect ratio truck tire.

The invention has been described with reference to a best mode. Obviously, modifications and alterations will occur to others upon reading and understanding of this specification. It is intended to include all such modifications and alterations in so far as they come within the scope of the appended claims or the equivalents thereof.

The invention claimed is:

1. A pneumatic tire comprising:
at least one pair of parallel annular beads;
at least one carcass ply wrapped around said beads;
a tread;
first and second sidewalls disposed between said tread and one of said at least one pair of beads; and
a crown reinforcing structure disposed between said at least one carcass ply and said tread in a crown area of said tire, said crown reinforcing structure comprising:
a first breaker between the at least one carcass ply and the tread;
a second breaker between the tread and the first breaker;
a third breaker between the tread and the second breaker;
a fourth breaker between the tread and the third breaker;
a fifth breaker between the tread and the fourth breaker, wherein the fourth and fifth breakers form a pair of working breakers, and wherein
the first breaker is a split breaker comprising two circumferential strips essentially adjacent to the shoulders of the tire, each strip having an axial width comprised between 50% and 70% of the half tread width; and wherein the first breaker has an angle comprised between 40° and 80° with respect to the equatorial plane of the tire, and the second and the third breakers have angles comprised between 0° and 4° Left or between 0° and 4° Right respectively with respect to the equatorial plane of the tire and the fourth and the fifth breakers have essentially opposite angles comprised between 30° and 75° with respect to the equatorial plane of the tire.

2. The tire according to claim 1, wherein wedges are provided between the axial edges of the third and the fourth breakers and/or between the axial edges of the fourth and the fifth breakers.

3. The tire according to claim 1, wherein each strip has an axial width between 55% and 65% of the half tread width.

4. The tire according to claim 1, wherein the axially outer ends of the strips of the first breaker are spaced an axial distance from the equatorial plane of between 80% and 105%, preferably between 80% and 95%, of the half tread width.

5. The tire according to claim 1, wherein the distance of the axially outer ends of the first breaker from the equatorial plane is larger than the distance of the axially outer ends of the second breaker from the equatorial plane, and/or comprising one or more of the following: the axial width of the second breaker being larger than the axial width of the third breaker, the axial width of the third breaker being larger than the axial width of the fourth breaker, and the axial width of the fourth breaker being larger than the axial width of the fifth breaker.

6. The tire according to claim 5, wherein the fourth breaker has an axial width comprised between 55% and 75% of the tread width.

7. The tire according to claim 1, wherein the tread comprises circumferentially arranged ribs, whereas the axial width of the shoulder rib is between 10% and 30% larger than the axial width of a center rib, and/or the width of an intermediate rib is up to 15% larger than the axial width of a center rib.

8. The tire according to claim 1, wherein relative to the equatorial plane of the tire, the axially outer ends of the fourth breaker and the axially inner ends of the strips overlap by between 25% and 35% of the half tread width, and optionally, the axially outer ends of the fifth breaker and the axially inner ends of the strips overlap by between 5% and 15% of the half tread width.

9. The tire according to claim 1, wherein the second and the third breakers have essentially the same axial width.

10. The tire according to claim 1, wherein the axial outer ends of the fourth breaker have essentially the same axial distance from the equatorial plane as the axial outer ends of the strips of the first split breaker.

11. The tire according to claim 1, wherein the first and the third breakers have a Right orientation with respect to the equatorial plane and the fifth breaker has a Left orientation with respect to the equatorial plane of the tire, or vice versa.

12. The tire according to claim 4, wherein the distance of the axially outer ends of the first breaker from the equatorial plane is larger than the distance of the axially outer ends of the second breaker from the equatorial plane, and/or comprising one or more of the following: the axial width of the second breaker being larger than the axial width of the third breaker, the axial width of the third breaker being larger than the axial width of the fourth breaker, and the axial width of the fourth breaker being larger than the axial width of the fifth breaker.

13. The tire according to claim 12, wherein the fourth breaker has an axial width comprised between 55% and 75% of the tread width.

14. The tire according to claim 1 wherein the tire is a low aspect ratio super single tire.

15. The tire according to claim 14 wherein the tire is a 495/45/R22.5 size.

16. The tire according to claim 1 wherein the tread has one or more center ribs, an intermediate rib on each tread half and a shoulder rib on each tread half, the shoulder rib has an axial width between 10% and 30% larger than a width of a center rib.

17. The tire according to claim 1 wherein a single layer of 0° to 4° cords is folded over to form the second and third breakers.

* * * * *